Oct. 11, 1938.  C. L. CLAFF  2,132,776
PAPER BOX, LID, OR THE LIKE
Filed Oct. 6, 1936  3 Sheets-Sheet 1
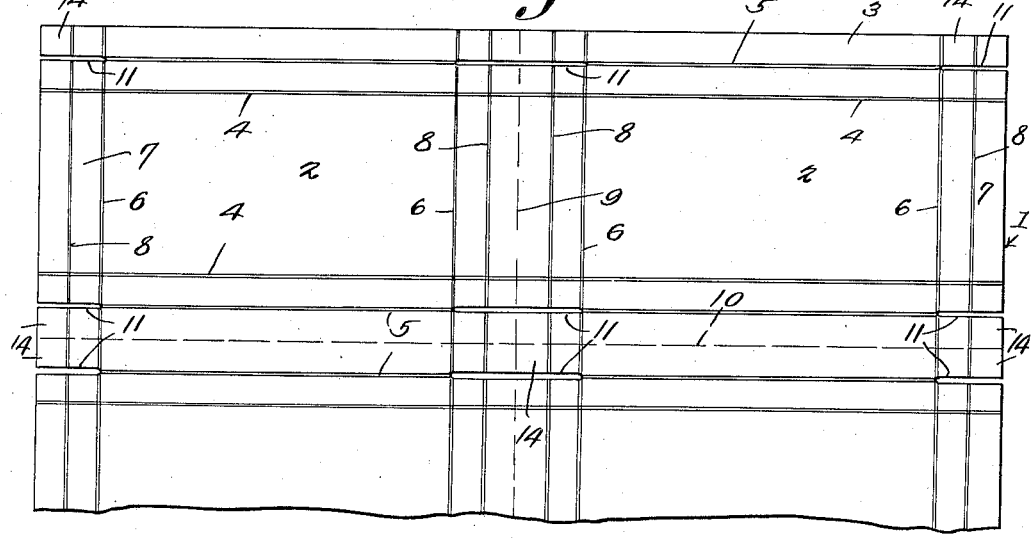
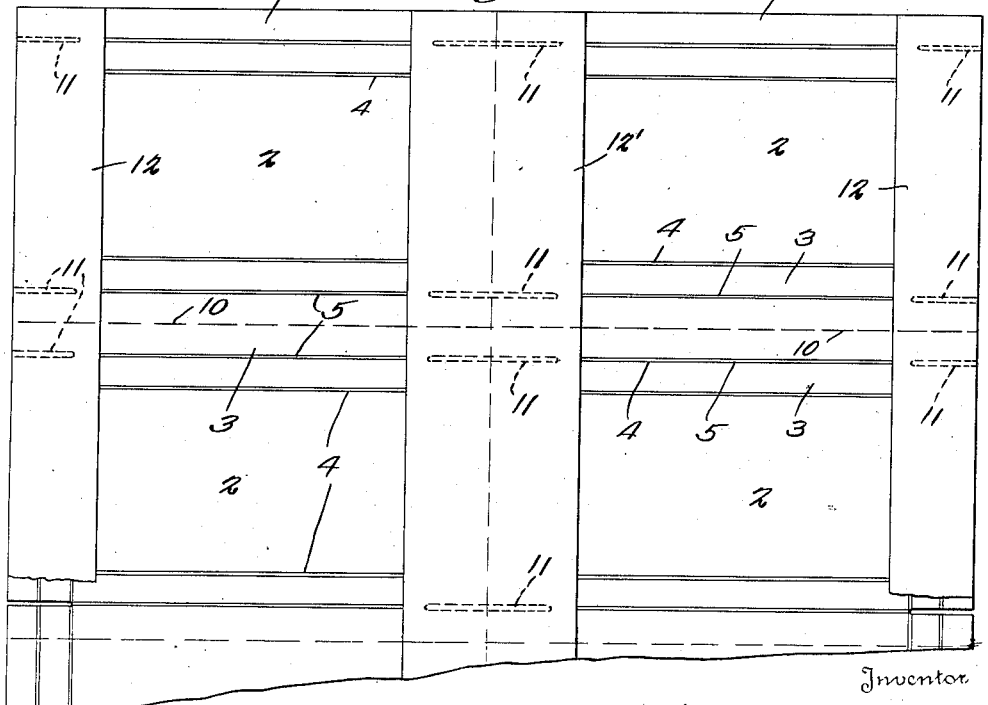
Inventor
C. L. Claff
By C. A. Snow & Co.
Attorneys.

Oct. 11, 1938.   C. L. CLAFF   2,132,776
PAPER BOX, LID, OR THE LIKE
Filed Oct. 6, 1936   3 Sheets-Sheet 2
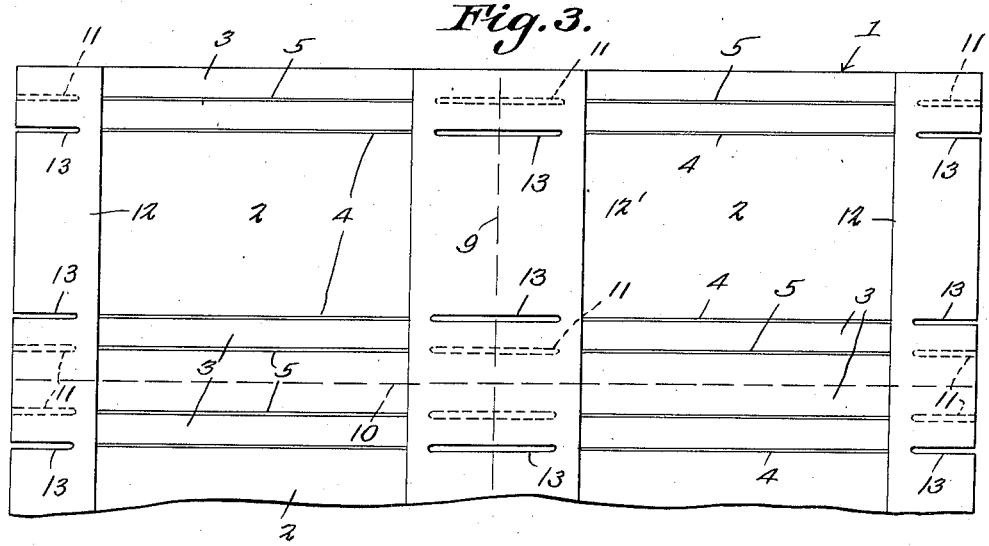
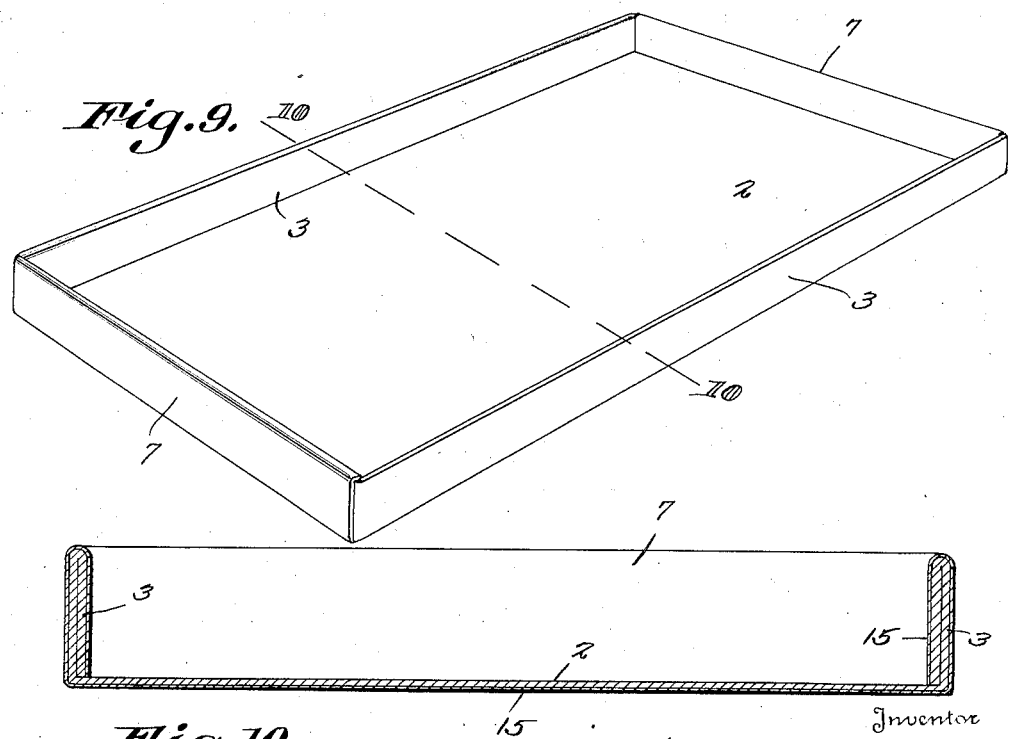
Inventor
C. L. Claff

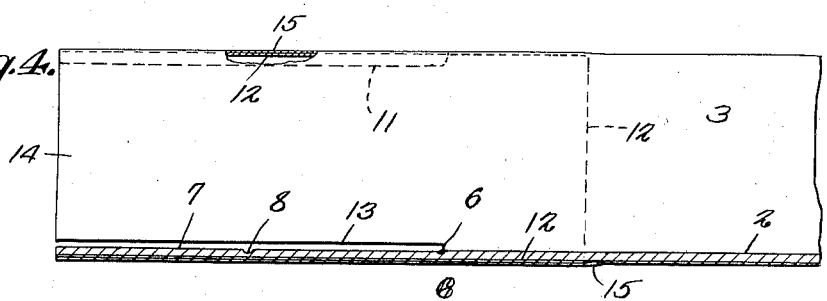

Patented Oct. 11, 1938

2,132,776

UNITED STATES PATENT OFFICE 2,132,776

PAPER BOX, LID, OR THE LIKE

Clarence Lloyd Claff, Randolph, Mass.

Application October 6, 1936, Serial No. 104,313

5 Claims. (Cl. 229—34)

This invention relates to paper boxes, lids or the like designed to be produced by the method disclosed in Patent 2,008,603 issued to me on July 16, 1935.

In the patented method slits are cut into a travelling web of paper board so as to extend transversely of the grain and said web is subsequently divided into separate blanks each of which has slits so disposed as to form side wings and end flaps.

It has been found in practice that a box or lid such as disclosed in the patent herein referred to must be formed of paper board of the usual thickness in order to give the requisite strength at the corners and along the creases. This is true particularly at the ends of the box or lid, which receive the greatest strain during the handling of the boxes.

An object of the present invention is to provide a box or lid which can be formed of much thinner stock than has heretofore been employed, thereby effecting a considerable saving in the cost of production.

A further object is to provide a paper box or lid so reenforced at its ends as to compensate for the thinness of the paper stock used and at the same time produce an end structure stronger than those commonly provided.

Another object is to produce a paper box or lid with a reenforcement of "kraft" tape so proportioned and located that when the box or lid is completed, each end thereof will include four thicknesses of "kraft" tape at the corner portions in addition to the thicknesses of the paper board used in the formation of the device.

A further object is to so locate the reenforcing material as to prevent the paper board from cracking along the folds while the box or lid is being set up.

Another object is to so shape the side wings of the box or lid that they will provide depressed seats for the end folds without necessitating severance of the reenforcing material, thereby permitting the exposed bends of the end folds to lie flush with the corresponding bends of the side of the box or lid without producing an undesirable bulge or break due to compression of excess material.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a bottom plan view of a portion of a web of paper board as initially cut and creased to define two series of blanks extending transversely of the web, the initial transverse cuts being formed in the web.

Figure 2 is a similar view showing the reenforcing or "kraft" tape applied to the blank so as to overlie the slits and all of the creases of the side wings and end folds of the blank.

Figure 3 is a view similar to Figure 2 showing supplemental slits extended into the reenforcing or "kraft" tape.

Figure 4 is an enlarged longitudinal section through one end portion of the blank showing the positions of the parts following the folding of one side of the blank and its erection perpendicular to the body portion and end fold.

Figure 5 is a vertical transverse section through one side portion of the structure after a side wing has been inturned and the end fold bent upwardly to a perpendicular position thereagainst.

Figure 6 is a section on line 6—6, Figure 5.

Figure 7 is a view similar to Figure 5 showing the positions of the parts after the end fold has been bent inwardly and downwardly over the side wing, a portion of the end fold being broken away.

Figure 8 is a section on line 8—8, Figure 7.

Figure 9 is a perspective view of a box or lid made from a blank as herein described.

Figure 10 is an enlarged section on line 10—10, Figure 9.

Referring to the figures by characters of reference I designates a web of paper board. This can be of much less thickness than that commonly employed in the manufacture of rigid boxes and lids and it can be of such a width as to produce either a single series of blanks extending longitudinally thereof or two or more series arranged side by side. In the drawings two parallel series of blanks are shown as being produced from a single web. The blanks made from the web all extend transversely of the grain of the web which, as is well known to those skilled in the art, extends longitudinally of the web.

Ordinarily it would not be practical to make a box lid or a box out of paper board of less than the standard weight used, this being due to the fact that the ends, when folded, break readily and do not have the requisite strength. In the present instance, however, the paper board forming the blank is suitably reenforced by "kraft" tape properly located as will be hereinafter explained.

In forming the lid or box from a web of paper board, said web is creased longitudinally and transversely so as to define the series of blanks to be produced from the web. For example a body portion 2 of each blank is separated from the side walls 3 of the blank by creases 4 extending transversely of the web and these side walls, in turn, are divided longitudinally by creases 5 extending transversely of the web. Additional creases 6 which extend longitudinally of the web divide the body portion 2 from the end folds 7 of the blank and also intersect creases 4 and 5 while additional longitudinal creases 8 extend longitudinally of the folds 7 at the centers thereof.

If the web 1 is of sufficient width to form two or more series of blanks as shown, for example, in Figures 1, 2 and 3, said series will be cut from each other at the proper time during the formation of the article and along the broken line 9. The blanks will also be severed from each other along transverse lines as indicated at 10.

Following the creasing operation heretofore described, the web is cut transversely along the creases 5 from the side edges of the web inwardly to the adjacent creases 6 and, if two series of blanks are being formed as shown for example in the drawings, further transverse incisions are cut along the creases 5 between those creases 6 at the inner ends of the defined blanks. The several slots produced at the sides and at intermediate points along the web have been indicated at 11.

Following the formation of the slot 11, strips of "kraft" tape are applied to one face of the web 1. One of the strips 12 is applied along the side edge portions of the web so as to cover the fold 7 and lap the adjacent portion of the body 2. Another length of "kraft" tape indicated at 12' is also applied to said surface of the web but is approximately twice the width of each tape 12 so as to cover the meeting end folds of the opposed series of defined blanks.

Obviously when these lengths of "kraft" tape are applied to the web, they will extend across and around all of the previously formed slits or incisions, as indicated in Figure 2.

Following the application of the reenforcing tape, additional incisions are formed in the web along the creases 4 and are parallel with and of the same length as the previously formed slits or incisions 11. These slits 13 extend through the reinforcing tape, as shown.

Following the application of the reenforcing tape and the formation of the slits, the blanks are separated by cutting along the lines indicated at 9 and 10. Thus it will be found that each of the side walls or folds 3 of each blank is formed at its ends with side wings 14 separated from the end folds 7 by the slits 13 and divided longitudinally by the slits 11. The side folds 3 are bent along the creases 5 and brought to position perpendicular to the body 2 so as thus to produce side walls of double thickness. This folding of the sides also causes the side wings 14 to fold upon themselves. Inasmuch as the paper board is cut away along the fold in each side wing due to the formation of the incisions 11, each side wing, when folded, will bend along the reenforcing tape only, which thus will be left standing above the edges of the incision as shown particularly in Figure 4.

As the side wings are divided from each end fold by the incision 13, they can next be swung toward each other as shown in Figures 5 and 6 after which the end fold 7 can be elevated to perpendicular position by being bent along the crease 6. Said end fold is then bent inwardly and downwardly from the upstanding position shown in Figures 5 and 6 to the final position shown in Figures 7 and 8 and during this shaping operation this end fold will crush the upstanding fold portion of the reenforcing tape 12 so that it will be compressed from the position shown in Figures 5 and 6 to the crumpled position shown in Figures 7 and 8. Consequently the outer surface of the bend in the end fold can be supported substantially flush with the outer surface of the bend in the side wall, this being due to the fact that the end folds will bear downwardly upon the depressed seats formed by the edges of the incisions 11 and by the crumpled reenforcing tape on said edges. The foregoing is clearly indicated in Figure 8.

Importance is attached to the fact that when a box or lid is formed as herein described, the reenforcing or "kraft" tape strengthens all portions of the inturned side wings and of the end folds and, furthermore, extends across all of the creases in the wings and folds so that danger of the material cracking along these creases is practically eliminated. Furthermore danger of the side wings cracking along the corners of the box or lid is likewise practically eliminated and, as the box is made of very thin stock, the exposed raw edges of the end folds will be very inconspicuous.

It is to be understood of course that the blanks can be provided with an outer thickness of covering paper or the like indicated generally at 15.

As each corner portion of the box is made up of two thicknesses of paper board which, in turn, are lapped by two thicknesses of the end fold and as these wing folds are all covered on one side with "kraft" tape, it will be apparent that at each corner portion there are provided in addition to the thicknesses of paper board, four thicknesses of reenforcing tape. Thus the end of the box or lid is greatly strengthened and although it may be made up of material much thinner than that commonly employed, it will have the strength and rigidity of structures made of much heavier material, and at greater cost.

What is claimed is:

1. A blank for use in the formation of a box or lid including a bottom portion, foldable side walls, wings constituting continuations of the side walls and foldable therewith, and end folds between the wings and spaced therefrom, all of the walls, wings, end folds, and bottom portion being formed in a single piece of box-board material there being slits dividing the wings longitudinally, and adhesive tapes of reenforcing material affixed to one surface of the blank for covering the end folds and wings and the adjacent portions of the side walls and bottom, said tapes being extended across said slits to provide unbroken reenforcements at the slits.

2. A blank for use in the formation of a paper box, lid or the like reenforced at all creases and folds in the ends thereof, said blank including a single piece of box-board material scored or creased transversely and longitudinally to define a bottom portion, side walls foldable longitudinally, and end folds, adhesive tapes of reenforcing material affixed to one surface of each end fold and the adjacent portions of the side walls and bottom, there being slits extending transversely of the end folds and partly across the tapes in line with those transverse scores or creases dividing the side walls from the bottom portion, said slits terminating at those longitudinal creases dividing the end folds from the bottom portion, thereby to provide end wings constituting extensions of the side walls and foldable therewith, additional slits being formed in the box-board material along the lines of fold of the end wings, said additional slits being covered by the tapes to provide unbroken reenforcements connecting the edges of each slit.

3. A blank for use in the formation of a paper box, lid or the like reenforced at all creases and folds in the ends thereof, said blank including a single piece of box-board material scored or creased transversely and longitudinally to define a bottom portion, side walls foldable longitudinally, and end folds, adhesive tapes of reenforcing material affixed to one surface of each end fold and the adjacent portions of the side walls and bottom, there being slits extending transversely of the end folds and partly across the tapes in line with those transverse scores or creases dividing the side walls from the bottom portion, said slits terminating adjacent to those longitudinal creases dividing the end folds from the bottom portion, thereby to provide end wings constituting extensions of the side walls and foldable therewith, additional slits being formed in the box-board material along the lines of fold of the end wings, said additional slits being covered by the tapes to provide unbroken reenforcements connecting the edges of each slit, said edges of the slits constituting depressed seats for supporting the end folds flush with the folded side walls and cooperating with the end folds to crumple those portions of the reenforcing tape therebetween.

4. A paper box or lid including folded side walls of box-board material having inturned folded side wings, reenforcing tapes affixed to one surface of the side walls and wings, said wings being slotted under the tapes to provide depressed seats bridged by portions of the tapes, and end folds straddling the inturned wings and supported by the seat flush with the folded side walls, those portions of the reenforcing tapes overlying the seats being crumpled but unbroken between the seats and the end folds.

5. A blank for use in the formation of a box or lid including a bottom portion, foldable side walls, wings constituting continuations of the side walls and foldable therewith, and end folds between the wings and spaced therefrom, all of the walls, wings, end folds, and bottom portion being formed in a single piece of box-board material there being slits dividing the wings longitudinally, and adhesive tapes of reenforcing material affixed to one surface of the end folds and wings and the adjacent portions of the side walls and bottom, said tapes being extended across said slits to provide unbroken reenforcements across the closed ends and at the sides of the slits.

CLARENCE LLOYD CLAFF.